US012633450B2

(12) United States Patent
Elshaer et al.

(10) Patent No.: US 12,633,450 B2
(45) Date of Patent: May 19, 2026

(54) INTEGRATED QUAD-CORE TRANSFORMER WITH ASYMMETRIC GAP DISTRIBUTION FOR MAGNETIC FLUX BALANCING

(71) Applicant: Ford Global Technologies, LLC, Dearborn, MI (US)

(72) Inventors: Mohamed Elshaer, Canton, MI (US); Chingchi Chen, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1279 days.

(21) Appl. No.: 17/145,117

(22) Filed: Jan. 8, 2021

(65) Prior Publication Data

US 2022/0223336 A1 Jul. 14, 2022

(51) Int. Cl.
*H01F 27/24* (2006.01)
*H01F 3/14* (2006.01)
*H01F 27/38* (2006.01)

(52) U.S. Cl.
CPC ............... *H01F 27/38* (2013.01); *H01F 3/14* (2013.01)

(58) Field of Classification Search
CPC ........ H01F 27/38; H01F 3/14; H01F 27/2804; H01F 27/06; H01F 27/24; H01F 27/28; H01F 27/30; H01F 27/34; H01F 2038/006
See application file for complete search history.

(56) References Cited

U.S. PATENT DOCUMENTS 4,409,523 A * 10/1983 Yasumura ................. H01F 3/14 336/215
2010/0232181 A1* 9/2010 Nakahori ............ H01F 27/2804 336/221
2014/0266550 A1* 9/2014 Turnbull ............ H01F 17/0006 336/200
2015/0123402 A1* 5/2015 Wagoner ................ F03D 9/255 336/170
2017/0330678 A1* 11/2017 Harrison .................. H01F 3/10
2018/0226182 A1* 8/2018 Fe ......................... H01F 27/245
(Continued)

FOREIGN PATENT DOCUMENTS

WO WO-2020115389 A1 * 6/2020 ............... H01F 3/12

OTHER PUBLICATIONS

"A Novel PCB Winding Transformer with Controllable Leakage Integration for a 6.6kW 500kHz High Efficiency High Density Bi-Directional Ob-Board Charger" by Li et al, published Mar. 26, 2017 (provided by applicant in information disclosure statement of Jan. 8, 2021) (Year: 2017).*
(Continued)

*Primary Examiner* — Mang Tin Bik Lian
(74) *Attorney, Agent, or Firm* — David B. Kelley; Brooks Kushman P.C.

(57) ABSTRACT

A first transformer includes a first quad core with four first legs and first windings wound around each of the first legs such that a winding direction for diagonal ones of the first legs is same. A second transformer includes a second quad core with four second legs and second windings wound around each of the second legs such that a winding direction for diagonal ones of the second legs is same. The first four legs and second four legs are arranged adjacent to, but spaced away from, each other to define four gaps. The first windings and second windings are in parallel.

17 Claims, 9 Drawing Sheets

(56) References Cited

U.S. PATENT DOCUMENTS

| | | | | |
|---|---|---|---|---|
| 2019/0043660 | A1* | 2/2019 | Jin | H02M 3/33592 |
| 2019/0355506 | A1* | 11/2019 | Fei | H01F 27/2804 |
| 2020/0227200 | A1* | 7/2020 | Zheng | H01F 27/26 |
| 2020/0287467 | A1* | 9/2020 | Sigamani | H01F 27/2804 |
| 2020/0350117 | A1* | 11/2020 | Nabih | H01F 38/00 |
| 2020/0395164 | A1* | 12/2020 | Ahmed | H01F 27/2804 |
| 2022/0084734 | A1* | 3/2022 | Lai | H02M 3/003 |
| 2022/0172880 | A1* | 6/2022 | Khaligh | H01F 27/2804 |
| 2022/0319769 | A1* | 10/2022 | Jitaru | H01F 27/2804 |

OTHER PUBLICATIONS

Chao Fei et al., "High-Efficiency High-Power-Density 380V/12V DC/DC Converter With A Novel Matrix Transformer", IEEE Conference Mar. 26-30, 2017, pp. 2428-2435.

Bin Li et al., "A Novel PCB Winding Transformer With Controllable Leakage Integration for a 6.6kW 500kHz High Efficiency High Density Bi-Directional On-Board Charger", IEEE Conference Mar. 26-30, 2017, pp. 2917-2924.

* cited by examiner

INTEGRATED QUAD-CORE TRANSFORMER WITH ASYMMETRIC GAP DISTRIBUTION FOR MAGNETIC FLUX BALANCING

TECHNICAL FIELD

This disclosure relates to automotive vehicle power electronic components.

BACKGROUND

Power systems may include transformers that permit flow of current between various sources and loads.

SUMMARY

A magnetically integrated quad-core transformer system includes a pair of quad cores each having a set of legs arranged such that the legs face, and are spaced away from, each other to define four air gaps of two different widths. The system also includes primary and secondary windings wound around each of the legs. One of the quad cores and the primary and secondary windings wound around the legs thereof define a first transformer. The other of the quad cores and the primary and secondary windings wound around the legs thereof define a second transformer. The primary and secondary windings of the first transformer are in parallel with the primary and secondary windings of the second transformer.

A transformer system includes a first transformer having a first quad core with four first legs and first windings wound around each of the first legs, and a second transformer having a second quad core with four second legs and second windings wound around each of the second legs. The first four legs and second four legs are arranged adjacent to, but spaced away from, each other to define four gaps of two different widths. The first windings and second windings are in parallel.

A transformer system includes a first transformer having a first quad core with four first legs and first windings wound around each of the first legs such that a winding direction for diagonal ones of the first legs is same, and a second transformer having a second quad core with four second legs and second windings wound around each of the second legs such that a winding direction for diagonal ones of the second legs is same. The first four legs and second four legs are arranged adjacent to, but spaced away from, each other to define four gaps. The first windings and second windings are in parallel.

DETAILED DESCRIPTION

Figure 1A:
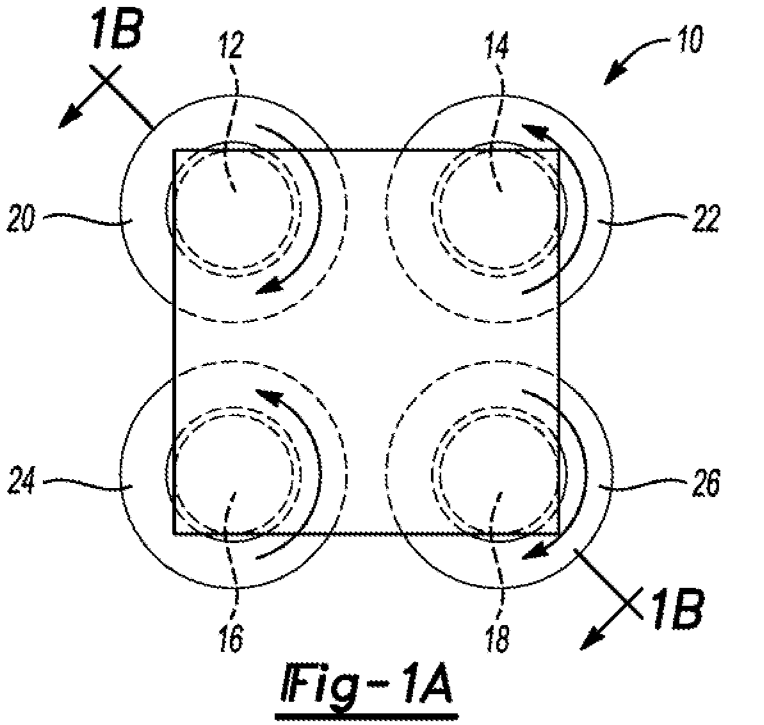
FIGS. 1A through 1D are schematic diagrams of a proposed magnetic structure.

The disclosed embodiments are merely examples and other embodiments can take various and alternative forms.

The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Windings of a single-phase transformer carry the full current. At higher power levels, large currents may cause excessive losses in the printed circuit board (PCB) windings. Paralleling the PCB layers may be necessary to achieve acceptable efficiency. Eddy current losses attributed to proximity and skin effects increase with the increased number of stacked PCB layers. One method for reducing current stress in windings is realized by reducing the number of stacked layers through the implementation of matrix transformers. An array of transformers are intertwined so that their combined structure functions as a single transformer. Primary and secondary windings can either be connected in parallel or in series to obtain the desired turn ratio.

Flux cancellation techniques have been utilized in matrix transformers to reduce ferrite utilization. Previously introduced matrix transformers that realize flux cancellation have a uniform primary and secondary winding distribution in each core leg. While the magnetizing inductance can be controlled by adjusting the air gap length, leakage inductance is not controlled.

EI cores have been used for building integrated transformers. Through the implementation of unevenly distributed primary and secondary windings in the outer core legs, an unbalance in flux density is realized. By adjusting the air gap length along with the winding distribution ratio, the flux densities in the outer legs are mismatched. The leakage inductance is controlled by setting the flux ratios in the core legs. This operation requires a third leg to pass the residual flux from the two outer legs.

Integration of a large leakage inductance without substantially growing the core size requires incorporating a large air gap. The fringing flux increases with the increased air gap length; higher losses are expected in the PCB layers near the air gap. In order to avoid large winding losses due to the fringing magnetic fields, the window length is increased. This comes at the expense of increasing the ferrite utilization. Also, increasing the flux path will result in higher core loss. Due to the uneven distribution of primary and secondary windings, an unbalance in the magnetic flux density can occur in the core legs. Due to the nature of imbalanced flux, the overutilization of ferrite material is needed to keep the peak flux density below the magnetic saturation limit.

Since the EI core is geometrically unsymmetrical, paralleled layers have an unequal current distribution and, consequently, higher winding losses. Paralleling two EI transformers may result in a more equalized current distribution between the paralleled layers. Due to the tolerance in the air gaps however, current sharing may be degraded.

Ferrite utilization reduction is achieved through the implementation of matrix transformers. The integration of large leakage inductance in a matrix transformer is challenging due to the unsymmetrical flux density. Integrated EI cores offer the ability to integrate the leakage inductance with the price of increased ferrite utilization. There is a need for a new magnetic structure that combines the benefits of a matrix transformer through flux cancellation while integrating large leakage inductance.

A quad-core with asymmetric air gap distribution is designed to realize a balanced flux density in all core legs. An uneven winding distribution between the primary and secondary windings is implemented on two diagonal legs. A same winding arrangement is implemented on the other diagonal legs. Windings wound around the first diagonal leg are flipped with respect to the windings wound around the second diagonal leg. The two primary windings implemented on the two diagonal legs are connected in series. Similarly, the two secondary windings implemented on the two diagonal legs are connected in series.

Figure 1B:
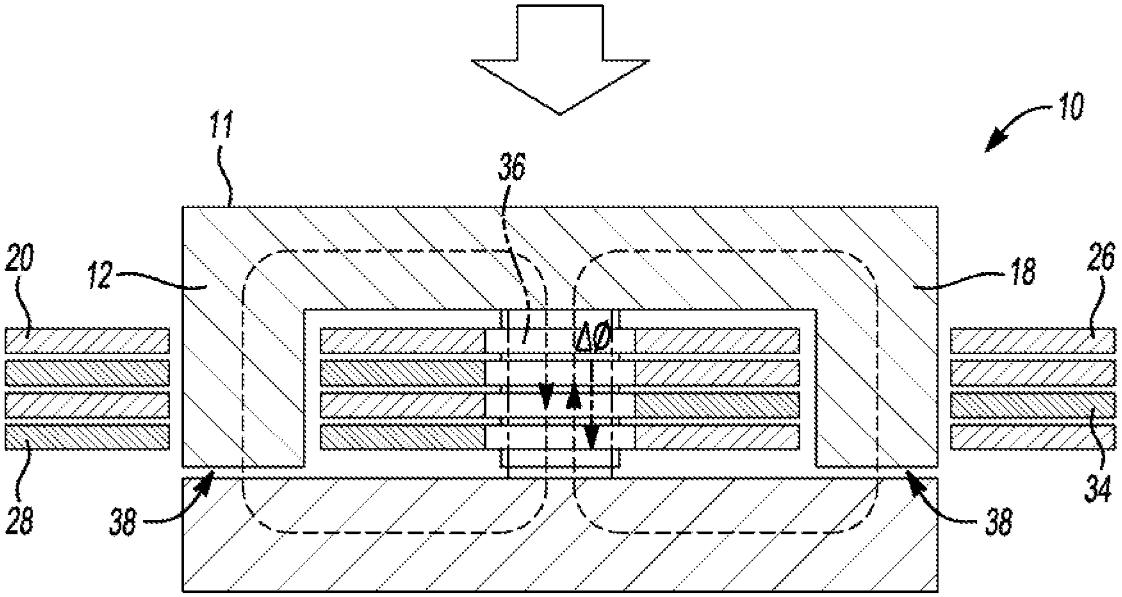

Referring to FIGS. 1A, 1B, IC, and ID, a transformer 10 includes a core 11 with four legs 12, 14, 16, 18. The legs 12, 18 form one diagonal pair, and the legs 14, 16 form another diagonal pair. Additionally, each of the legs 12, 14, 16, 18 has a respective primary winding 20, 22, 24, 26 wound therearound, and a secondary winding 28, 30, 32, 34 wound therearound. The number of turns of the primary winding 20 is less than the number of turns of the primary winding 26. That is, the number of turns for each of the primary windings 20, 26 is different. Similarly, the number of turns for each of the secondary windings 28, 34 is different. Likewise, the number of turns for each of the primary windings 22, 24 is different, and the number of turns for each of the secondary windings 30, 32 is different. An imaginary center leg 36 is added for explanation purposes. Air gaps 38 are implemented at the legs 12, 14, 16, 18 while the imaginary center leg 36 has no air gap.

Figure 1C:
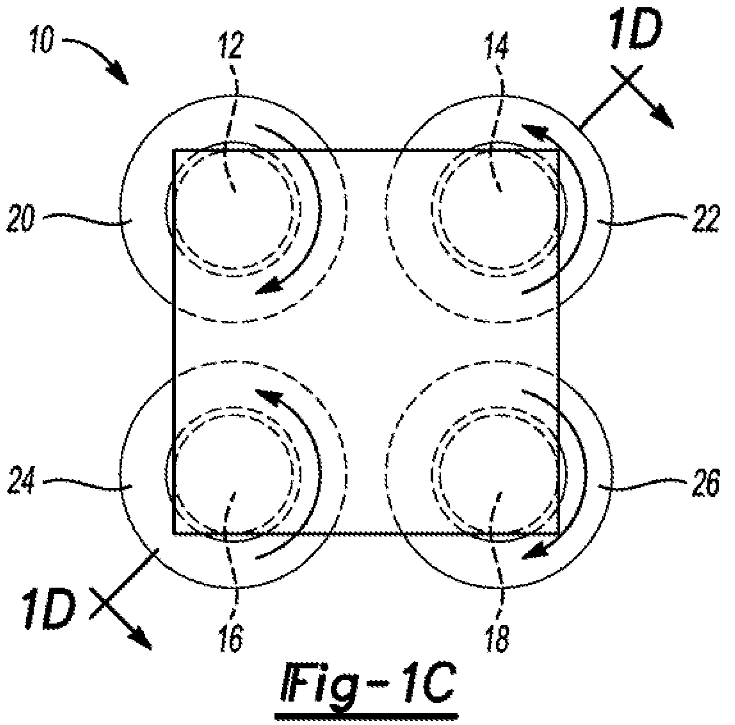
Figure 1D:
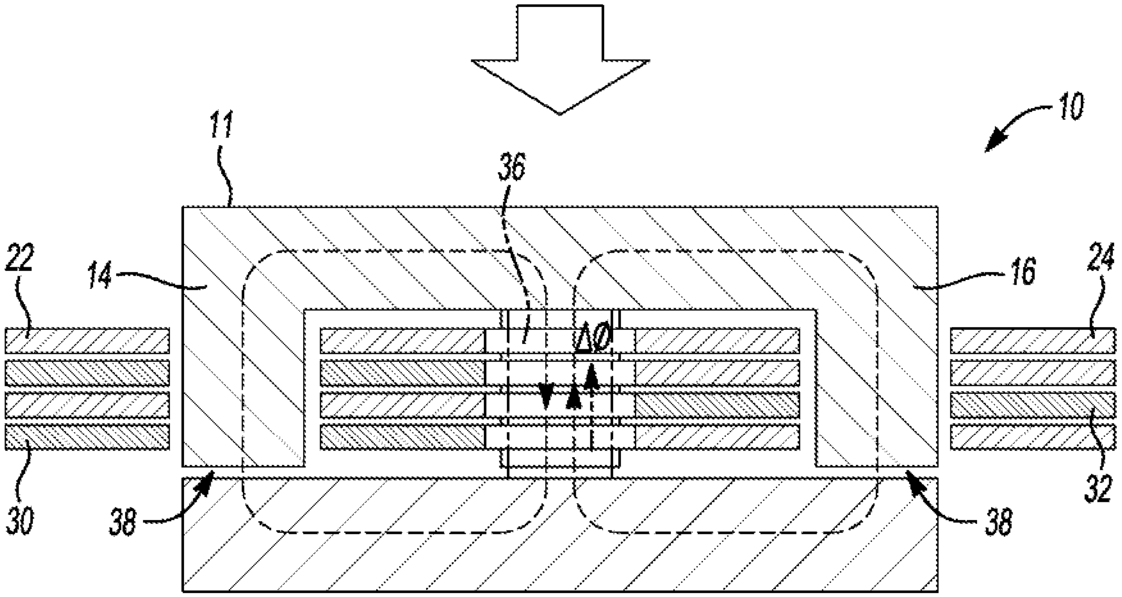
Figure 2A:
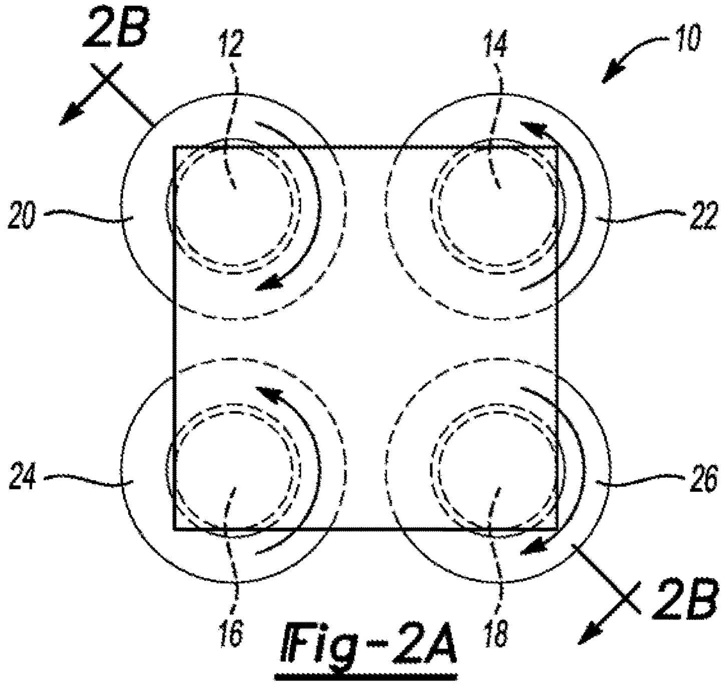
FIGS. 2A through 2D are schematic diagrams of two paralleled quad-core transformers.
Figure 2B:
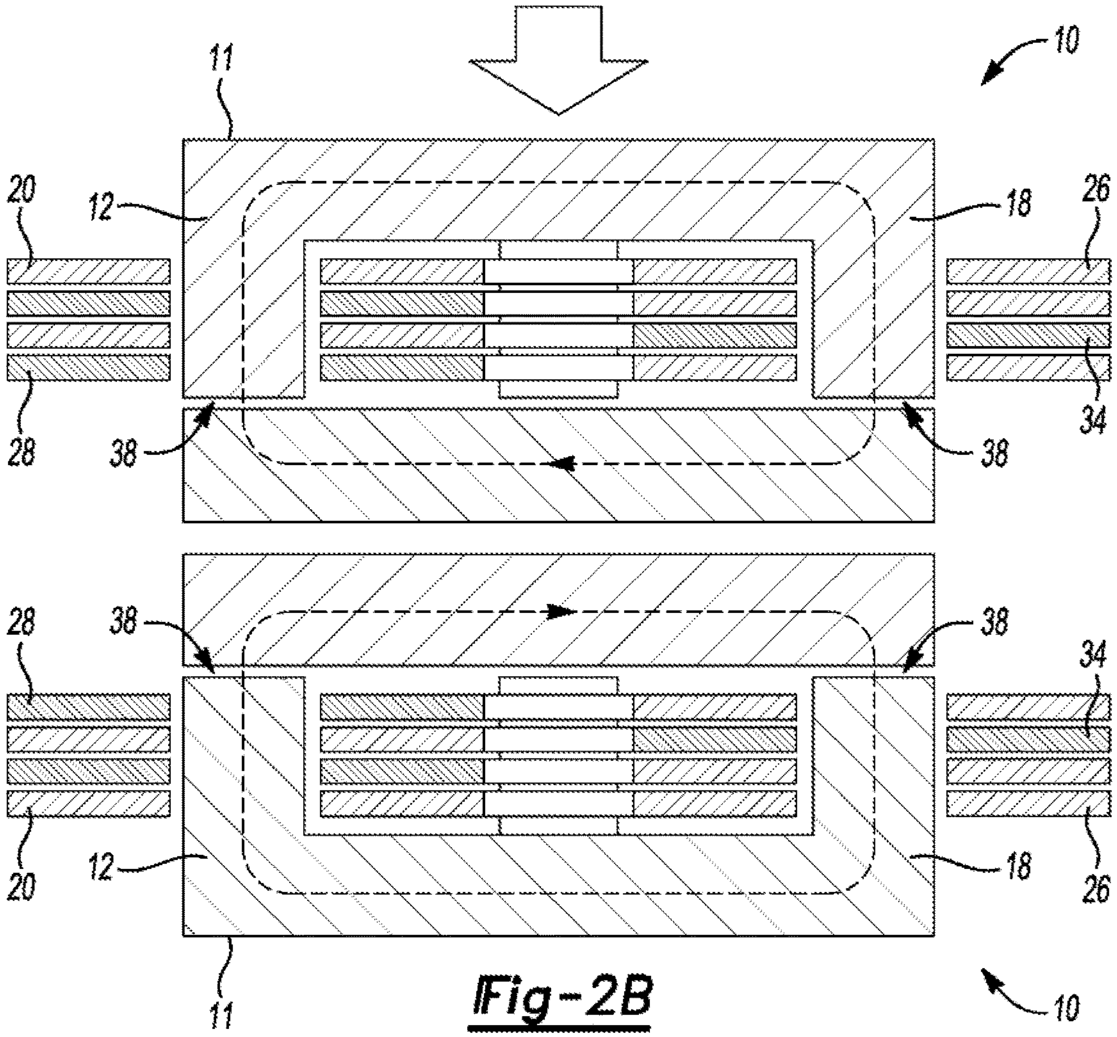
Figure 2C:
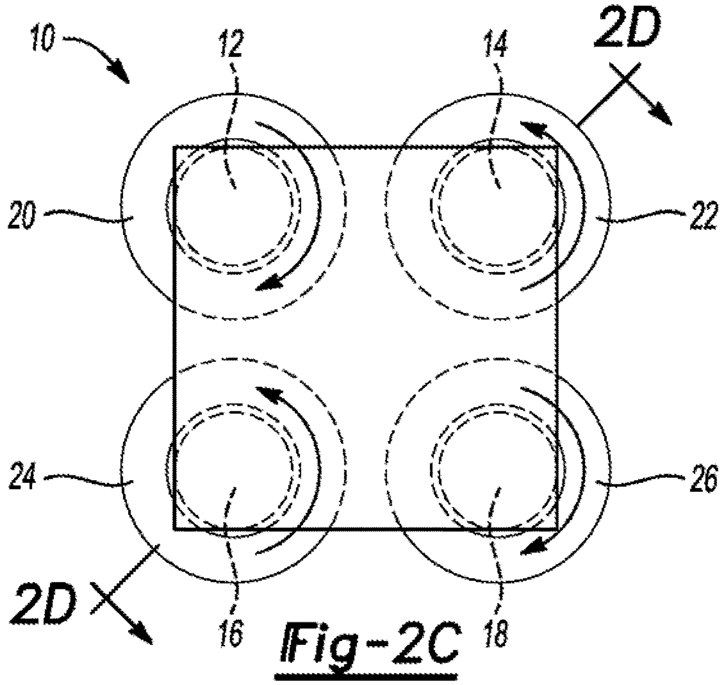
Figure 2D:
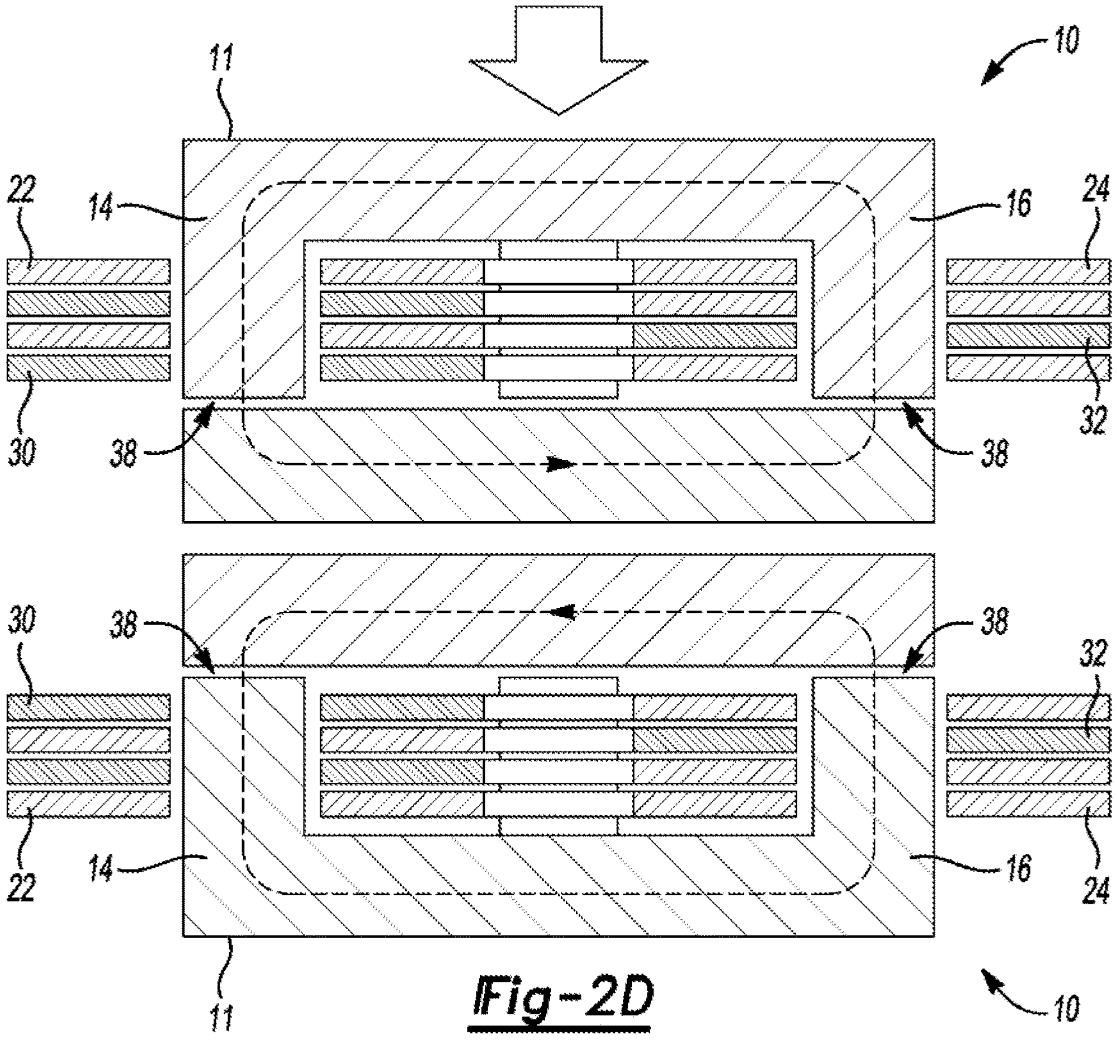

For each of the diagonal pairs of legs 12, 18 and 14, 16, the flux generated by the primary and secondary windings on the left leg is decoupled from the flux generated from the primary and secondary windings on the right leg. The air gaps 38 and windings turn ratio on both sides are adjusted to realize the desired magnetizing and leakage inductances. If two EI cores are implemented, the imaginary center leg 36 must be used as a return path for the flux. In the proposed transformer, two EI cores are positioned in a crossed fashion allowing for an imaginary center leg to be shared. Since the imaginary center leg 36 has no air gap, the flux generated by the windings 20, 22, 24, 26, 28, 30, 32, 34 on the legs 12, 14, 16, 18 is decoupled. By applying opposite winding arrangements (shown by arrows in FIGS. 1A and 1C) between the two diagonal legs 12, 18 and 14, 16, the flux in the imaginary center leg 36 is cancelled, thus the center leg can be removed. That is, the flux density in the imaginary center leg 36 with reference to FIG. 1B is not zero due to the unevenly distributed windings. Since the winding direction is flipped in FIG. 1D however, the net flux density in the imaginary center leg 36 has the same magnitude as in FIG. 1B, but opposite polarity.

Figure 3:
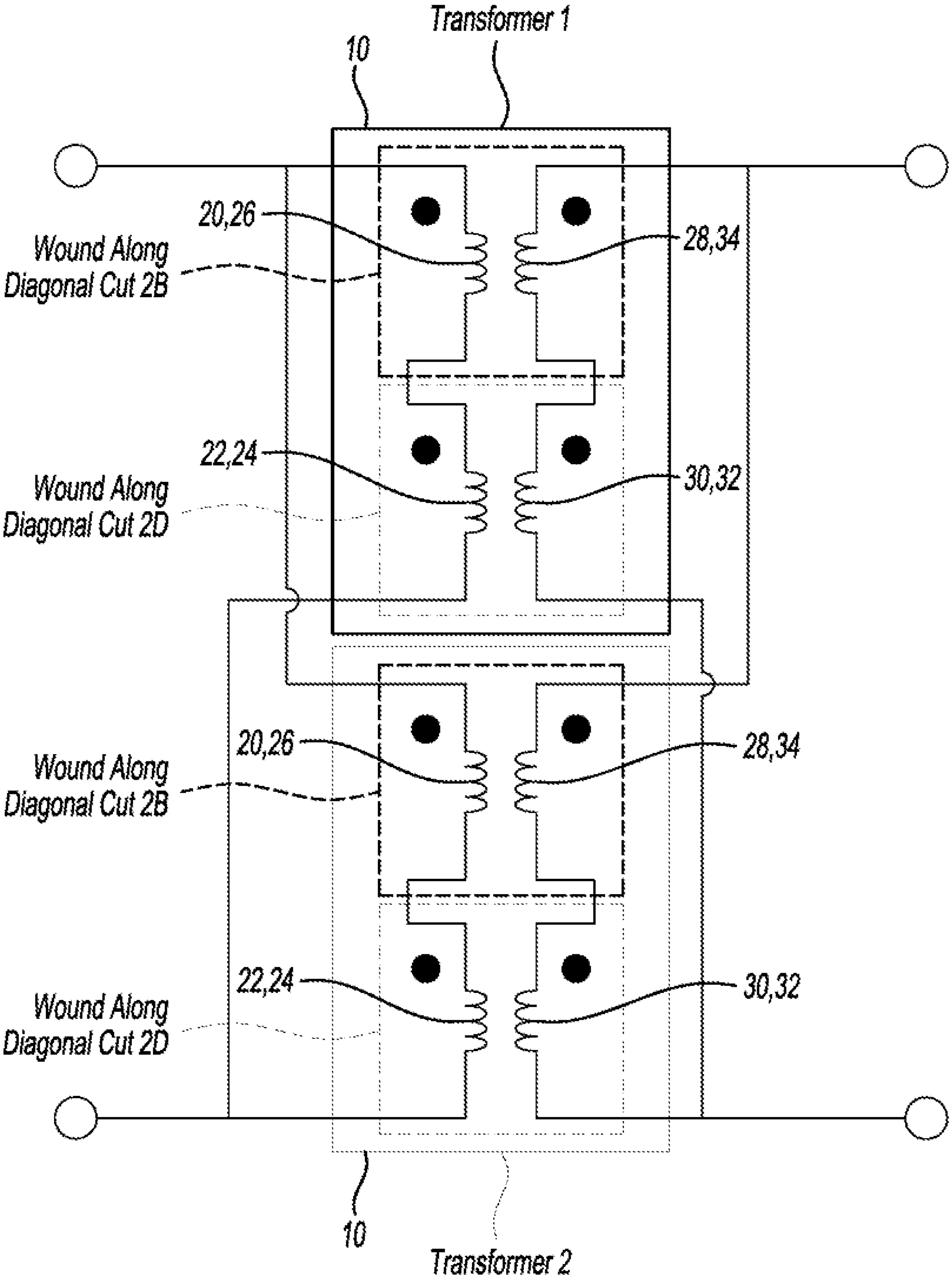
FIG. 3 is a circuit diagram of the transformers of FIGS. 2A through 2D.
Figure 4A:
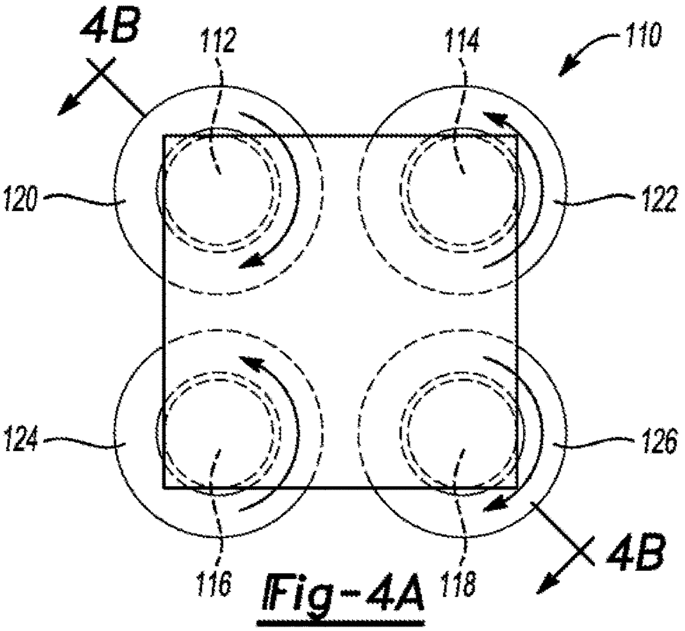
FIGS. 4A through 4D are schematic diagrams of magnetically integrated two paralleled quad-core transformers.
Figure 4B:
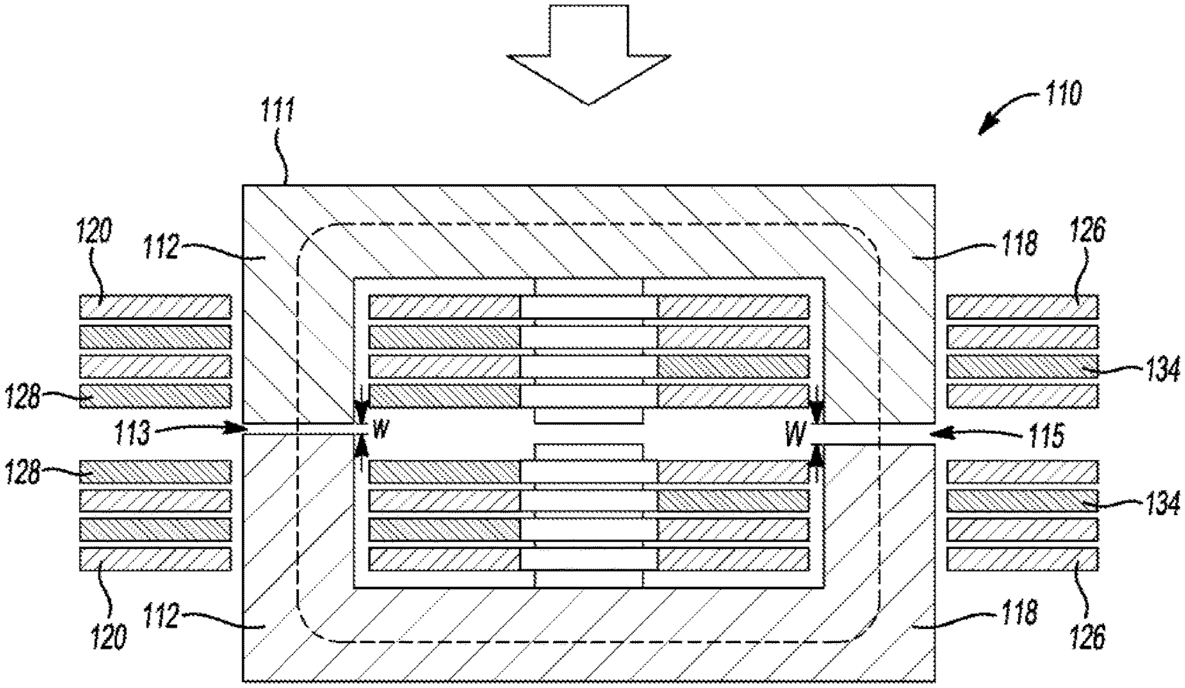
Figure 4C:
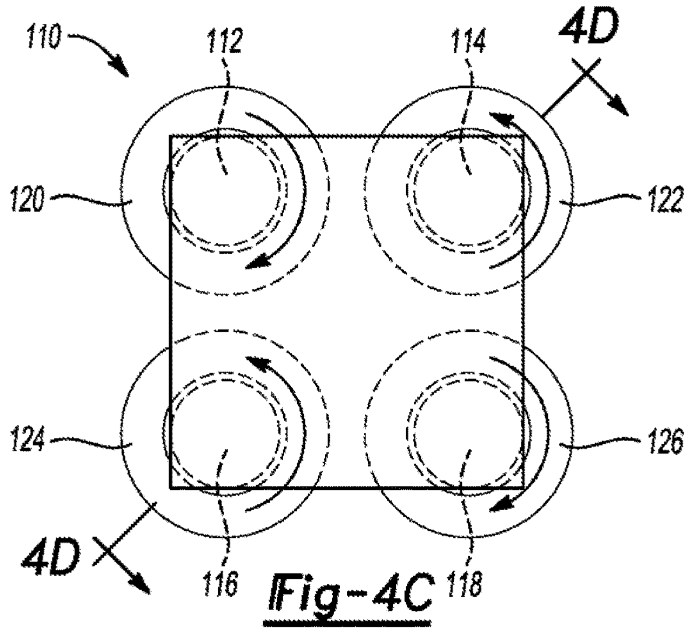
Figure 4D:
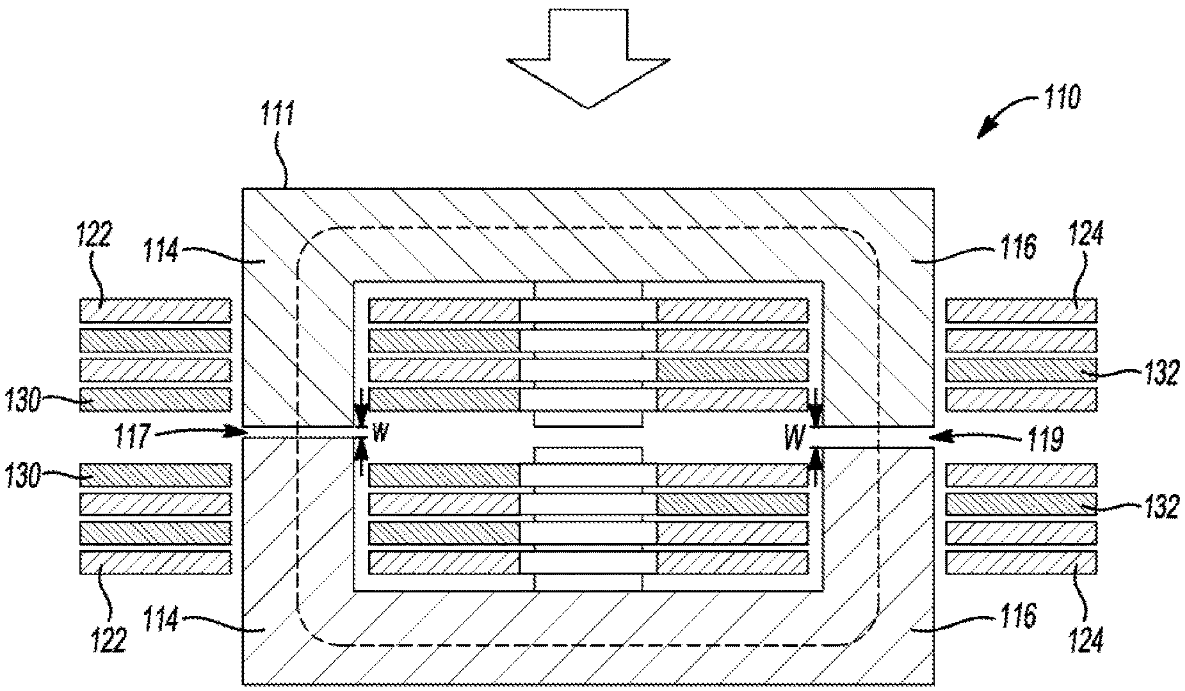
Figure 5:
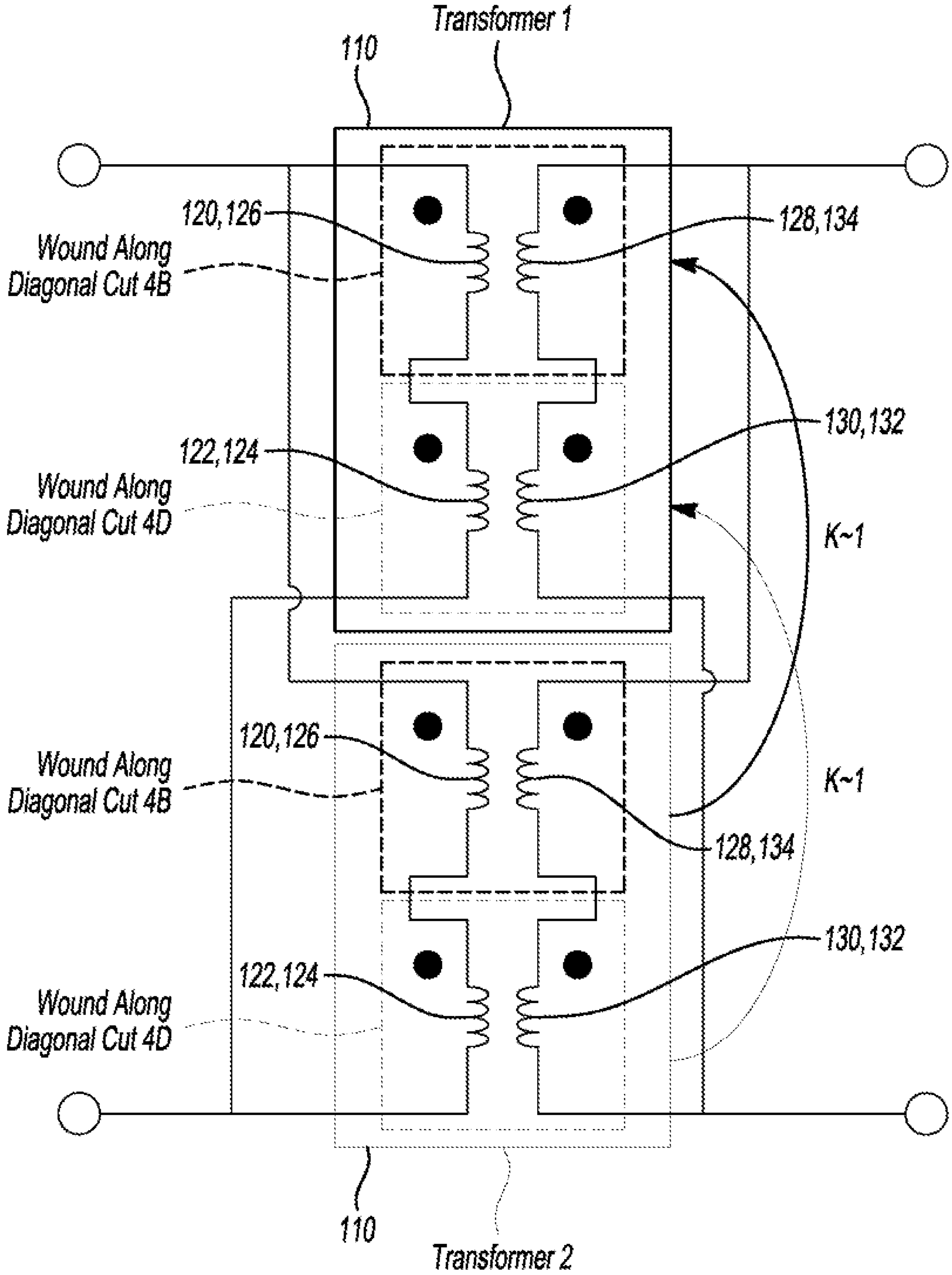
FIG. 5 is a circuit diagram of the transformers of FIGS. 4A through 4D.

For high power applications, connecting multiple windings in parallel may be necessary for current sharing and loss optimization. Due to the unsymmetrical geometry of the QI core, the winding near the air gap will have higher losses. Hence, paralleling two transformers rather than two windings may be the better option. Current sharing problems, however, may arise due to the tolerances of the air gaps. To solve this problem, two of the transformers 10 are arranged as shown in FIGS. 2A, 2B, 2C, and 2D, with the primary coils 20, 22, 24, 26 and secondary coils 28, 30, 32, 34 of each of the transformers 10 being connected as shown in FIG. 3. That is for each of the transformers 10, the series connected primary coils 20, 26 are connected in series with the series connected primary coils 22, 24. Similarly, the series connected secondary coils 28,34 are connected in series with the series connected secondary coils 30, 32. Also, the primary and second coils of the transformers 10 are in parallel with each other.

If the "I" sections of the cores 11 are shared between the two transformers, a net-zero flux is expected to flow in it due to the opposing flux directions. By eliminating the "I" sections, the symmetric structure in FIGS. 4A, 4B, 4C, and 4D is realized. Thus, a pair of transformers 110 each includes a quad core 111 with four legs 112, 114, 116, 118, and are arranged such that the legs 112, 114, 116, 118 face, and are spaced away from, each other to define four air gaps 113, 115, 117, 119 of at least two different widths, w, W.

The legs 112, 118 form one diagonal pair, and the legs 114, 116 form another diagonal pair. Additionally, each of the legs 112, 114, 116, 118 has a respective primary winding 120, 122, 124, 126 wound therearound, and a secondary winding 128, 130, 132, 134 wound therearound. The number of turns of the primary winding 120 is less than the number of turns of the primary winding 126. That is, the number of turns for each of the primary windings 120, 126 is different. Similarly, the number of turns for each of the secondary windings 128, 134 is different. Likewise, the number of turns for each of the primary windings 122, 124 is different, and the number of turns for each of the secondary windings 130, 132 is different.

For each of the diagonal pairs of legs 112, 118 and 114, 116, the flux generated by the primary and secondary windings on one of the legs is decoupled from the flux generated from the primary and secondary windings on the other of the legs. The air gaps 113, 115, 117, 119 and windings turn ratio on both sides are adjusted to realize the desired magnetizing and leakage inductances. Since the windings share the same flux path and the core has a symmetrical shape, perfect current sharing between the paralleled windings is accomplished.

The proposed integrated transformers achieve a 30% reduction in ferrite utilization as compared to other arrangements. The integration of a large resonant inductor is achieved for transformers with an uneven distribution of primary and secondary windings. Through the implementation of uneven air gap lengths between the diagonal core legs, an equalized flux density is realized in all core branches without compromising the ability to realize flux cancellation.

Figure 6:
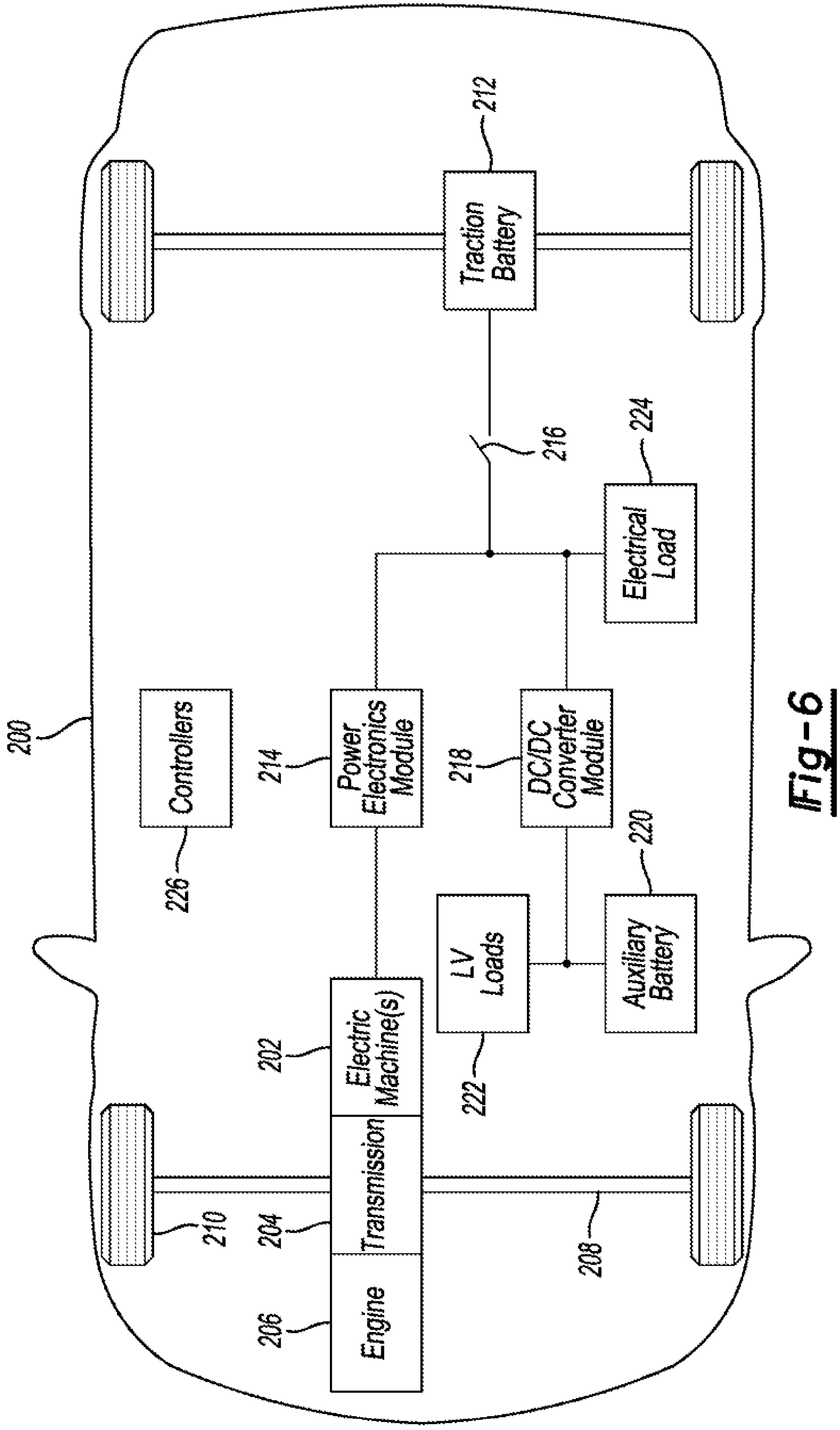
FIG. 6 is a schematic diagram of a vehicle.

The transformers contemplated herein can be used within the context of vehicle, such as the vehicle 200 of FIG. 6. The vehicle 200 includes one or more electric machines 202 mechanically coupled to a hybrid transmission 204. The electric machines 202 may operate as a motor or generator. In addition, the hybrid transmission 204 is mechanically coupled to an engine 206 and drive shaft 208. The drive shaft 208 is mechanically coupled to wheels 210. The electric machines 202 can provide propulsion and slowing capability when the engine 206 is turned on or off. The electric machines 202 may also act as generators and can provide fuel economy benefits by recovering energy that would normally be lost as heat in a friction braking system. The electric machines 202 may also reduce vehicle emissions by allowing the engine 206 to operate at more efficient speeds and allowing the vehicle 200 to be operated in electric mode with the engine 206 off under certain conditions. The vehicle 200 may also be a battery electric vehicle. In such a configuration, the engine 206 may not be present. Other arrangements are also contemplated.

A traction battery or battery pack 212 stores energy that can be used by the electric machines 202. The vehicle battery pack 212 may provide a high voltage direct current (DC) output. The traction battery 212 may be electrically coupled to one or more power electronics modules 214, which may include the transformers contemplated herein. One or more relays 216 may isolate the traction battery 212 from other components when opened and connect the traction battery 212 to other components when closed. The power electronics module 214 is also electrically coupled to the electric machines 202 and provides the ability to bi-directionally transfer energy between the traction battery 212 and the electric machines 202. For example, the traction battery 212 may provide a DC voltage while the electric machines 202 may operate with a three-phase alternating current (AC). The power electronics module 214 may convert the DC voltage to a three-phase AC current to operate the electric machines 202. In a regenerative mode, the power electronics module 214 may convert the three-phase AC current from the electric machines 202 acting as generators to the DC voltage compatible with the traction battery 212.

In addition to providing energy for propulsion, the traction battery 202 may provide energy for other vehicle electrical systems. The vehicle 200 may include a DC/DC converter module 218 that converts the high voltage DC output of the traction battery 212 to a low voltage DC supply that is compatible with low-voltage vehicle loads. The DC/DC converter module 218 may include the transformers contemplated herein. An output of the DC/DC converter module 218 may be electrically coupled to an auxiliary battery 220 (e.g., 12 V battery) for charging the auxiliary battery 220. Low-voltage systems 222 may be electrically coupled to the auxiliary battery 220. One or more electrical loads 224 may be coupled to the high-voltage bus. The electrical loads 224 may have an associated controller that operates and controls the electrical loads 224 when appropriate. Examples of the electrical loads 224 include a fan, electric heating element, air-conditioning compressor, and other heating, ventilating, and air conditioning components.

The engine 206 may also provide energy for other vehicle electrical systems. The engine 206 via the transmission 204 may drive the electric machines 202 to generate power for the power electronics module 214 and electrical loads 224, etc. In plug-in configurations, the electrified vehicle 200 may be configured to recharge the traction battery 212 as well as power the electrical loads 224 from an external power source.

Controllers/interfaces/modules 226 in the vehicle 200 may communicate via one or more vehicle networks, and exert control over the components shown. The vehicle network may include a plurality of channels for communication. One channel may be a serial bus such as a CAN. Another channel may include an Ethernet network defined by the Institute of Electrical and Electronics Engineers 802 family of standards. Additional channels may include discrete connections between modules and may include power signals from the auxiliary battery 220. Different signals may be transferred over different channels. For example, video signals may be transferred over a high-speed channel (e.g., Ethernet) while control signals may be transferred over CAN.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A magnetically integrated quad-core transformer system comprising:

a pair of quad cores each having a set of legs arranged such that the legs are spaced away from, each other to define four air gaps of two different widths; and primary and secondary windings wound around each of the legs, wherein one of the quad cores and the primary and secondary windings wound around the legs thereof define a first transformer, wherein the other of the quad cores and the primary and secondary windings wound around the legs thereof define a second transformer, wherein the primary and secondary windings of the first transformer are electrically in parallel with the primary and secondary windings of the second transformer and wherein at least some of the primary and secondary windings of the first transformer are wound around a diagonal pair of the legs of the first transformer.

2. The system of claim 1, wherein the primary windings wound around two of the legs of the one of the quad cores has fewer turns than the primary windings wound around the other two of the legs of the one of the quad cores.

3. The system of claim 2, wherein the secondary windings wound around the two of the legs of the one of the quad cores has more turns than the secondary windings wound around the other two of the legs of the one of the quad cores.

4. The system of claim 3, wherein a primary-secondary turns arrangement for the first and second transformers are mirror symmetric.

5. The system of claim 1, wherein a winding direction for diagonal legs of the first transformer are same.

6. The system of claim 1, wherein a winding direction for diagonal legs of the second transformer are same.

7. A transformer system comprising:

a first transformer including a first quad core with four first legs and first windings wound around each of the first legs, wherein at least some of the first windings are wound around a diagonal pair of the first legs; and a second transformer including a second quad core with four second legs and second windings wound around each of the second legs, wherein the first four legs and second four legs are arranged adjacent to, but spaced away from, each other to define four gaps of two different widths, and wherein the first windings and second windings are electrically in parallel.

8. The transformer system of claim 7, wherein the first windings include first primary windings and first secondary windings, and wherein the first primary windings wound around two of the first legs has fewer turns than the first primary windings wound around the other two of the first legs.

9. The transformer system of claim 8, wherein the first secondary windings wound around the two of the first legs has more turns than the first secondary windings wound around the other two of the first legs.

10. The transformer system of claim 9, wherein a primary-secondary turns arrangement for the first and second transformers are mirror symmetric.

11. The transformer system of claim 7, wherein a winding direction for diagonal legs of the first transformer are same.

12. The transformer system of claim 7, wherein a winding direction for diagonal legs of the second transformer are same.

13. A transformer system comprising:

a first transformer including a first quad core with four first legs and first windings wound around each of the first legs such that a winding direction for diagonal ones of the first legs is same; and a second transformer including a second quad core with four second legs and second windings wound around each of the second legs such that a winding direction for diagonal ones of the second legs is same, wherein the first four legs and second four legs are arranged adjacent to, but spaced away from, each other to define four gaps, and wherein the first windings and second windings are electrically in parallel.

14. The transformer system of claim 13, wherein the four gaps are of two different widths.

15. The transformer system of claim 13, wherein the first windings include first primary windings and first secondary windings, and wherein the first primary windings wound around two of the first legs has fewer turns than the first primary windings wound around the other two of the first legs.

16. The transformer system of claim 15, wherein the first secondary windings wound around the two of the first legs has more turns than the first secondary windings wound around the other two of the first legs.

17. The transformer system of claim 16, wherein a primary-secondary turns arrangement for the first and second transformers are mirror symmetric.

* * * * *